US009321301B2

(12) United States Patent
Dingle et al.

(10) Patent No.: US 9,321,301 B2
(45) Date of Patent: Apr. 26, 2016

(54) ATTACHMENT ARRANGEMENT FOR COMPOSITE WHEELS

(75) Inventors: Matthew Edward Dingle, Torquay (AU); Donald Brett Gass, Forest Lake, MN (US); Ashley James Denmead, Belmont (AU)

(73) Assignee: CARBON REVOLUTION PTY, LTD., Waurn Ponds, Victoria (AU)

( * ) Notice: Subject to any disclaimer, the term of this patent is extended or adjusted under 35 U.S.C. 154(b) by 114 days.

(21) Appl. No.: 14/130,038

(22) PCT Filed: May 30, 2012

(86) PCT No.: PCT/AU2012/000598
§ 371 (c)(1),
(2), (4) Date: Feb. 11, 2014

(87) PCT Pub. No.: WO2013/000009
PCT Pub. Date: Jan. 3, 2013

(65) Prior Publication Data
US 2014/0175863 A1    Jun. 26, 2014

(30) Foreign Application Priority Data

Jun. 30, 2011 (AU) ................................ 2011902599

(51) Int. Cl.
*B60B 3/14* (2006.01)
*F16B 43/00* (2006.01)
(Continued)

(52) U.S. Cl.
CPC ................ *B60B 3/145* (2013.01); *B60B 3/147* (2013.01); *B60B 3/16* (2013.01); *B60B 5/02* (2013.01);
(Continued)

(58) Field of Classification Search
CPC .......... B60B 3/14; B60B 3/145; B60B 3/147; B60B 3/165; F16B 43/00
USPC ............. 301/35.621, 35.622, 35.623–35.626; 411/531
See application file for complete search history.

(56) References Cited

U.S. PATENT DOCUMENTS 2,283,860 A * 5/1942 Manning ...................... 301/36.1
5,123,711 A    6/1992 Woelfel et al.
(Continued)

FOREIGN PATENT DOCUMENTS

JP        63-195001 A      8/1988

OTHER PUBLICATIONS

International Search Report mail date Aug. 24, 2012 for International Application No. PCT/AU2012/000598 filed on May 30, 2012 y Carbon Revolution Pty Ltd. Entitled Attachment Arrangement for Composite Wheels; 3 pages.

*Primary Examiner* — John Walters
*Assistant Examiner* — James Triggs
(74) *Attorney, Agent, or Firm* — Cesari and McKenna, LLP

(57) ABSTRACT

The present invention provides an attachment arrangement for use in attaching at least one composite wheel to a mount using an elongate fastener element and a fastening nut which can be fastened on the elongate fastener element. The attachment arrangement is used with a composite wheel that includes at least one attachment aperture through which the elongate fastener element is inserted. The attachment arrangement includes a fastening washer having a fastening aperture through which the elongate fastener element can be inserted when in use. The fastening aperture includes a radially central fastening axis. The fastening washer also has a base configured to face a surface of the composite wheel about the attachment aperture. In addition, the fastening washer has a fastening side facing substantially axially outwardly from the attachment aperture. The fastening side includes at least one engagement surface configured to operatively engage a complementary portion of the fastening nut when the fastening nut is assembled on the elongate fastener element. The fastening arrangement also includes a sleeve which extends axially relative to the fastening axis outwardly from the base about the fastening aperture. The sleeve is configured to extend into the attachment aperture of the composite wheel. The sleeve also includes a distal end configured to be received in a complementary shaped sleeve aperture located in the mount or in an element located adjacent the mount.

19 Claims, 4 Drawing Sheets

(51) Int. Cl.
   *B60B 3/16*   (2006.01)
   *B60B 5/02*   (2006.01)
   *B60B 27/00*   (2006.01)
   *F16B 19/02*   (2006.01)

(52) U.S. Cl.
   CPC ............ *F16B 43/00* (2013.01); *B60B 27/0052* (2013.01); *B60B 2360/36* (2013.01); *B60B 2900/212* (2013.01); *B60B 2900/325* (2013.01); *F16B 19/02* (2013.01)

(56) References Cited

U.S. PATENT DOCUMENTS

| | | | |
|---|---|---|---|
| 6,416,135 | B1 | 7/2002 | Greubel et al. |
| 7,934,778 | B2 * | 5/2011 | Denk et al. ............... 301/95.103 |
| D710,191 | S * | 8/2014 | Yamazaki ..................... D8/399 |
| 8,911,026 | B2 * | 12/2014 | Pruden et al. ............ 301/35.632 |

\* cited by examiner

ATTACHMENT ARRANGEMENT FOR COMPOSITE WHEELS

CROSS REFERENCE TO RELATED APPLICATIONS

This application is the National Stage of International Application No. PCT/AU2012/000598, filed on May 30, 2012, which claims the benefit of Australian Application No. 2011902599, filed on Jun. 30, 2011. The contents of both applications are hereby incorporated by reference in their entirety.

FIELD OF THE INVENTION

The present invention generally relates to an arrangement for attaching one or more composite wheels to a mount. The invention is particularly applicable to attachment arrangements for carbon fibre wheels and it will be convenient to hereinafter disclose the invention in relation to that exemplary application.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Attaching composite structures to other components or structures can be challenging. Composite structures, such as carbon fibre components, are generally extremely stiff in the fibre direction, but can have less strength perpendicular to the fibre direction. Attachment holes for a bolted joint connection are generally formed perpendicular to the fibre direction. Compressive loads through a joint formed through such attachment holes will therefore be perpendicular to the fibres rather than aligned with them. The stiffness of the material perpendicular to the fibres is quite low. Consequently, a low clamping pressure is required between the head of a bolt/washer and a mount to which it is to be connected to avoid damage. High clamping pressures can damage composite material at or immediately adjacent a preformed attachment hole, causing delamination at or immediately adjacent the edge of that attachment hole. This makes it difficult to achieve a stiff joint with conventional attachment and fastening arrangements.

A washer may be used to distribute the load over a greater area. However, conventional flat washers provide an uneven load distribution about the attachment aperture. In most cases, the load is greater in the region closer to the head of the bolt, thus creating an undesirable high compression zone close to the edge of the attachment hole.

Special fastener combinations may therefore be used for composite structures. However, most prior bolt-nut combinations include geometries which effect a loading of composite structures at or immediately adjacent an attachment hole in which they are used, and therefore contribute to a weakening, breakdown or destruction of the composite material in this area.

It would therefore be desirable to provide an attachment arrangement for a composite wheel that overcomes one or more of the above limitations.

SUMMARY OF THE INVENTION

The present invention provides an attachment arrangement for use in attaching at least one composite wheel to a mount using an elongate fastener element and a fastening nut which can be fastened on the elongate fastener element. It is envisaged that the attachment arrangement can be used with a composite wheel that includes at least one attachment aperture through which the elongate fastener element is inserted. The attachment arrangement includes a fastening washer having a fastening aperture through which the elongate fastener element can be inserted when in use. The fastening aperture includes a radially central fastening axis. The fastening washer also has a base configured to face a surface of the composite wheel about the attachment aperture. In addition, the fastening washer has a fastening side facing substantially axially outwardly from the attachment aperture. The fastening side includes at least one engagement surface configured to operatively engage a complementary portion of the fastening nut when the fastening nut is assembled on the elongate fastener element. The fastening arrangement also includes a sleeve which extends axially relative to the fastening axis outwardly from the base about the fastening aperture. The sleeve is configured to extend into the attachment aperture of the composite wheel. The sleeve also includes a distal end configured to be received in a complementary shaped sleeve aperture located in the mount or in an element located adjacent the mount.

The attachment arrangement of the present invention enables the composite wheel to have an extremely stiff fastening to the mount relative to the fastening nut without damaging the composite wheel. This can reduce or substantially eliminate loss of fastening torque associated with any external loading conditions in the attachment arrangement. Progressive loss of fastening torque can result in the bolted joint to loosen and the fastener to rotate resulting in further torque loss and reduction of the joint clamping load.

It should be understood that the mount can be a support, backing, setting, or the like, on or in which something is, or is to be, mounted or fixed. In preferred embodiments, the mount would be a wheel mount (or wheel hub) for the composite wheel.

The sleeve is preferably designed to prevent the washer from collapsing inwards when high loads are applied to the attachment arrangement. The sleeve functions to distribute the load away from the centre of the fastening aperture. The sleeve is therefore configured to extend into and through the attachment aperture of the composite wheel and to be received in a complementary shaped sleeve aperture located in the mount or in an element located adjacent the mount. In some embodiments, the sleeve aperture may be formed in the mount. In other embodiments, the attachment arrangement may include a further component, such as a backing element, locating element, backing washer of the like which includes the sleeve aperture.

The sleeve aperture and distal end of the sleeve can have a complementary configuration in some forms which substantially prevents axial rotation of the sleeve relative to the mount. The complementary configuration can comprise any feature that provides a locked fit between the sleeve and sleeve aperture including (but not limited to) at least one of a polygonal shape, irregular shape, spline, flat, recess, shoulder, projection, spigot, key, cavity, groove or finger. In a preferred embodiment, the sleeve aperture and distal end of the sleeve have a complementary hexagonal shape.

In other embodiments, the base of the fastening washer may include a feature that which substantially prevents axial rotation of the sleeve relative to the mount. This feature may comprise one of more projections, spigots, elongate, flanges or embossments that are seated in at least one complementary groove, hole, aperture, detent, recess or depression in the surface of the composite wheel.

The sleeve aperture is preferably sized to allow at least a portion of the sleeve to move through the sleeve aperture. The sleeve can therefore be designed to provide a clearance between the bottom of the sleeve and the surface surrounding the sleeve aperture. There is preferably a light press fit between the sleeve and the element which includes the sleeve aperture so that the sleeve can slide through the sleeve aperture when the attachment arrangement is compressed. This reduces the possibility of the sleeve making contact with the mount and transferring some of the clamping load to the mount or radially within the attachment aperture and/or sleeve aperture. It is preferable for all the compression loading from the fastener to go through the composite structure.

The sleeve may include a cutout section to provide clearance between the distal end of the sleeve and a section of the surface the backing element proximal the sleeve aperture. The cutout section can comprise any depression, groove or cavity configured to provide the required clearance. For example, in one embodiment, the cutout section comprises a step in the distal end of the sleeve.

The sleeve can have any suitable cross-section. In preferred forms, the sleeve has a circular or polygonal radial cross-section relative to the fastening axis. The fastening washer and sleeve can be integrally formed from a single piece of material, such as metal which could be cast, forged or machined from billet. In other embodiments, the fastening washer and sleeve can be formed from two or more separate elements which can be joined together to form the attachment arrangement of the present invention.

The attachment arrangement can further include a backing element configured to be inserted between the mount and the composite wheel. The backing element can include at least one section of the sleeve aperture, and preferably the entire sleeve aperture. In a preferred form, the backing element comprises a plate configured to abut a surface of the composite wheel about the attachment aperture. Where the composite wheel includes at least two fastening apertures, the backing plate can include at least the same number of sleeve apertures configured to cooperate with sleeves from respective fastening washers inserted through each of these fastening apertures. For example, where the composite wheel is a wheel (for example a carbon fibre wheel) which attaches to a wheel mount using three or more wheel studs, the backing plate can comprise an annular plate which includes a corresponding number of sleeve apertures to the number of wheel studs.

The distal end of the sleeve can have a fixing feature which prevents withdrawal of the sleeve through the sleeve aperture of the backing plate. This fixing feature can be any element or formation. In one embodiment, the distal end of the sleeve is inserted through the sleeve aperture and then the end is deformed to a greater size than the sleeve aperture. This deformation can have any shape or configuration. In one embodiment, the distal edge is deformed to form a rolled edge. This deformation provides the added advantage of adding an amount of compressive pre-load to the joint during assembly. This arrangement still allows the sleeve to slide relative to the backing plate in one direction but prevents the whole assembly from falling apart when the fastener element is removed.

The fastening washer section of the attachment arrangement of the present invention is configured to provide an increased clamping contact area with the surface of the composite wheel surrounding the attachment aperture and thereby increase the area through which the clamping force is applied to that area.

The engagement surface can extend from any portion of the fastening that engages with the fastening nut when the fastening nut is fastened onto the elongate fastener element. In most cases, the engagement surface will be a major feature of the fastening side. For example, where the washer has a circular or torriodal shape or the like, the engagement surface comprises a substantially annular portion of the fastening side.

In some embodiments, the engagement surface is angled or curved relative to the fastening axis. The angle or curved shape of the engagement surface of the fastening washer can provide an additional feature that enables the force to be distributed away from the edge of a surface located about the attachment aperture and is more evenly distributed on the composite structure.

The engagement surface of the fastening washer can have any suitable angle or curve relative to the fastening axis which allows the fastening nut and fastening washer to engage together and transfer compression force from this joint away from the fastening aperture. In some embodiments, the engagement angle is 90 degrees relative to the fastening axis. The washer in this embodiment resembles a conventional flat washer. In other embodiments, the engagement surface of the fastening washer is angled or curved relative to the fastening axis. Where the engagement surface is angled, the engagement surface can be angled between 10 and 80 degrees relative to the fastening axis. In some preferred embodiments, the engagement surface is angled between 30 and 60 degrees relative to the fastening axis. Where the engagement surface is curved relative to the fastening axis, the curve can be convex or concave relative to the fastening axis. In preferred forms, the curve has a radius of curvature which is equal to or less than the radius of the fastening aperture.

The engagement surface of the fastening washer may comprise part of, or the entirety of the fastening side. In some embodiments, the engagement surface extends from a base position proximate the fastening aperture to a peak position at a location spaced radially away from the fastening aperture relative to the fastening axis. The fastening side can also include trailing surface, which extends from the peak position to a radially distal edge of the fastening washer. The trailing surface is preferably angled relative to the fastening axis. However, it should be appreciated that the trailing surface may have any shape or configuration such as round, square or another polygonal cross-sectional shape. The fastening washer can have any suitable shape. In an exemplary form, the base, engagement surface and trailing surface of the fastening washer form a substantially triangular shaped toroid.

The base of the fastening washer is preferably configured to transfer compression force from the washer through to composite wheel. The base can therefore have a complementary configuration to the surface of the composite wheel it faces. More preferably, the base has complementary contours and features to the surface of the composite wheel about the attachment aperture. For example, where the surface of the composite wheel about the attachment aperture is substantially flat, the base can include a substantially flat engagement surface. This surface can be configured to abut the surface of the composite wheel about the attachment aperture.

The base of the fastening washer may be bonded to the abutting surface of the composite wheel in some embodiments. This fixes the fastening washer in place onto the composite wheel. In contrast, it is preferred that the sleeve is not bonded to the composite wheel in any way. This allows the sleeve to slide relative to the fastening aperture in the composite structure.

The elongate fastener can comprise any suitable interlocking fastening arrangement with the fastening nut. In a preferred form, the elongate fastener element includes an external threaded surface and the fastening nut includes a complementary threaded internal bore. In some embodiments, the composite wheel is of a centre lock type wherein the attachment aperture has a complementary thread to the elongate fastener. The elongate fastener can have an integrated threaded head.

The arrangement can further include a fastening washer according to the first aspect of the present invention. The arrangement also includes a fastening nut which can be fastened to the elongate fastener element. The fastening nut has an engagement portion having a substantially complementary shape to the engagement surface of the fastening washer. In use, the engagement portion of the fastening nut engages with the engagement surface of the fastening washer when the fastening nut is assembled on the elongate fastener to fasten the composite wheel between the fastening washer and the mount.

The composite wheel fastened using the attachment arrangement can be any composite material in which compression joint damage can occur, for example, a fibre reinforced composite such as (but not limited to) a carbon fibre composite material or carbon/epoxy composite. It should however be understood that other types of composite materials other than carbon fibre and epoxy resin could be used in the composite wheels of the present invention which use the same joint. One preferred application is for attaching the composite wheel to a wheel mount, and more preferably one or more carbon fibre composite wheels.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
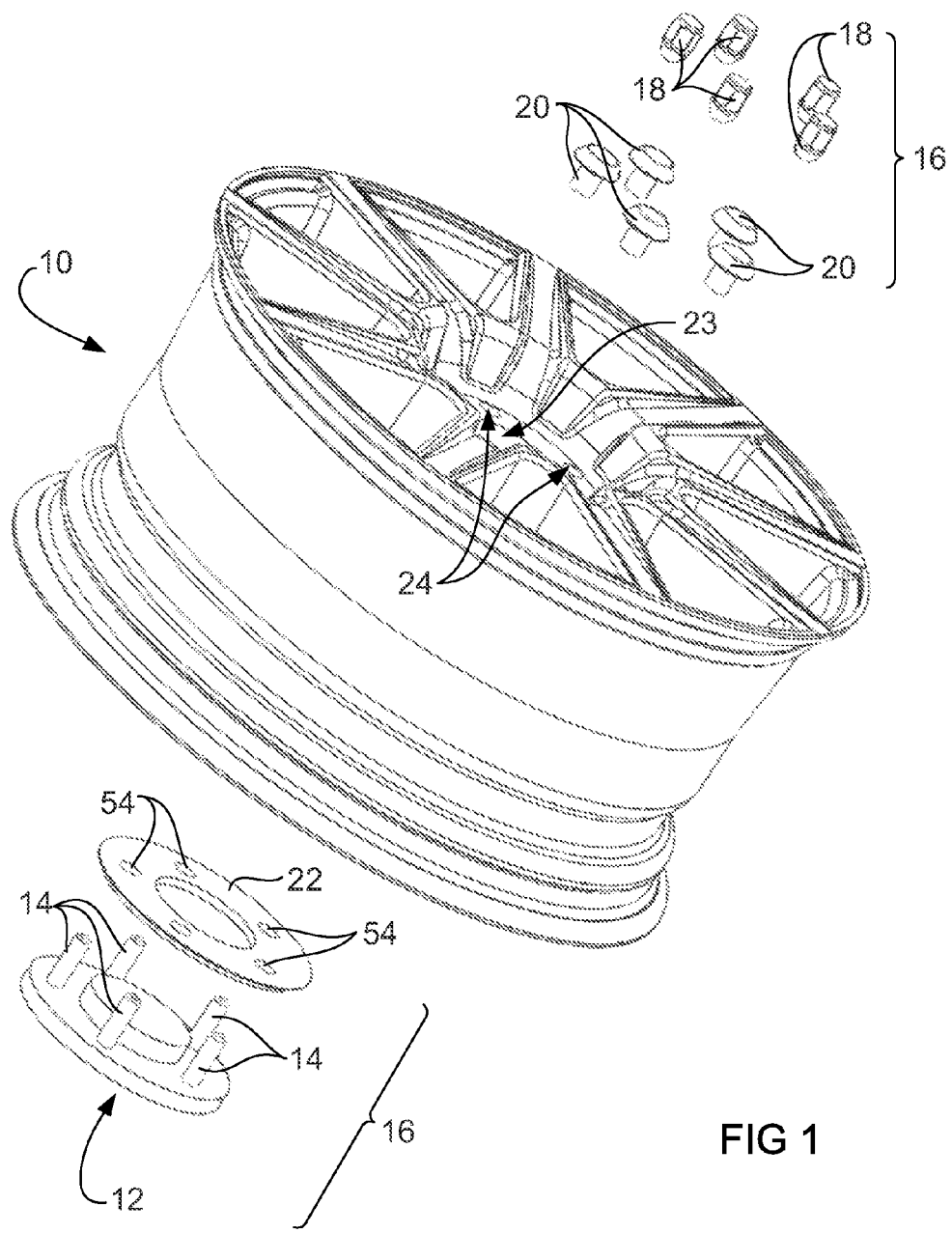
FIG. 1 provides a perspective construction view of a carbon fibre wheel, wheel mount and wheel attachment arrangement which connects the wheel to the wheel mount according to a first preferred embodiment of the present invention.

FIG. 1 illustrates a carbon fibre composite wheel 10 which is attached to a wheel mount (or wheel hub) 12 through wheel studs 14 using an attachment arrangement 16 according to a first preferred embodiment of the present invention.

The illustrated attachment arrangement 16 comprises fastening nuts 18 which can be fastened onto the wheel studs 14, fastening washers 20 and a backing plate 22.

The composite wheel 10 is a one piece carbon fibre wheel. The hub portion 23 of the wheel 10 includes five attachment apertures 24 through which the wheels studs 14 of the wheel mount 12 are inserted when the wheel 10 is mounted on the wheel mount 12. Each of the wheel studs 14 are an elongate externally threaded pin having a complementary thread to a threaded internal bore 25 (FIG. 3) of each of the fastening nuts 18.

Figure 2:
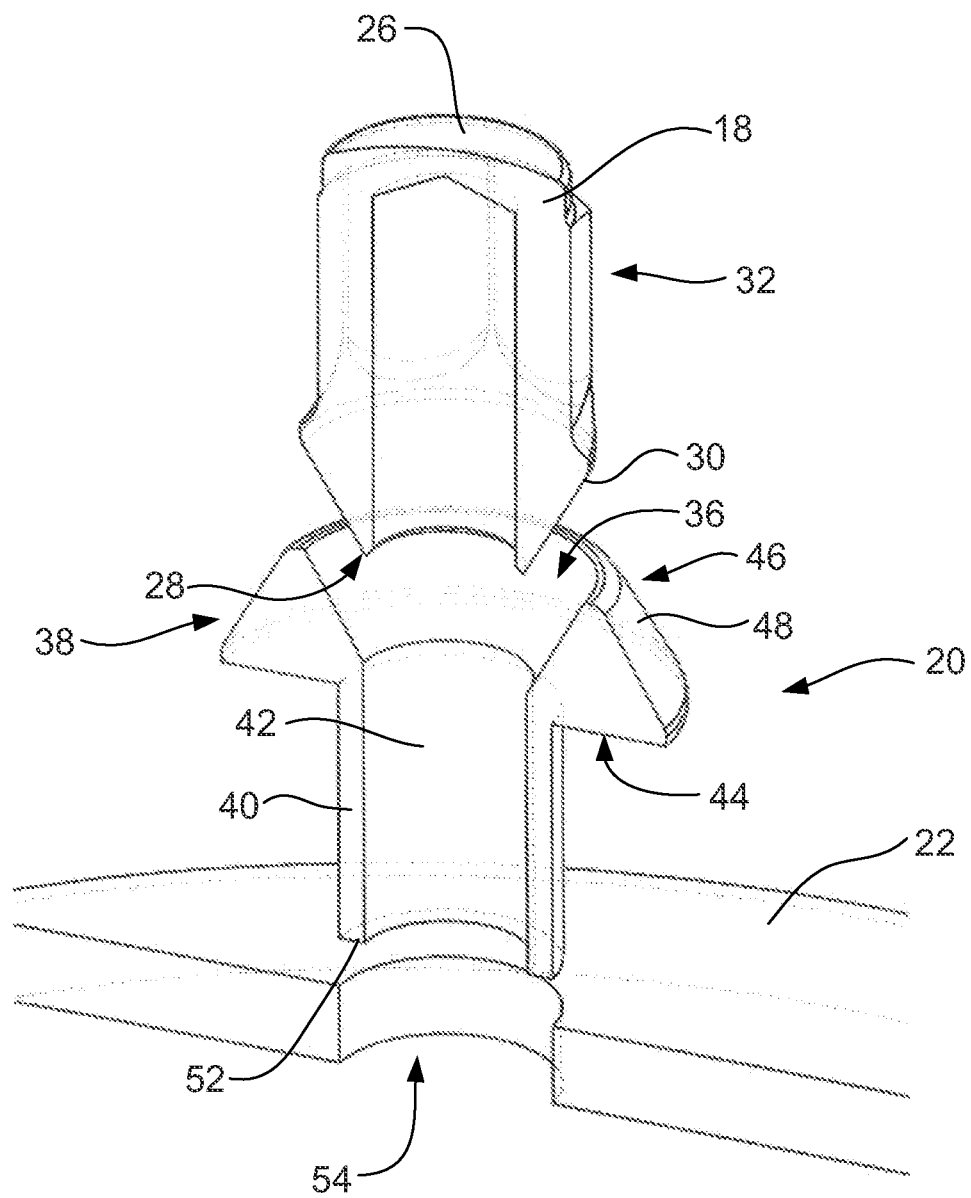
FIG. 2 provides an enlarged front perspective cross-sectional view of a portion of the wheel attachment arrangement shown in FIG. 1.
Figure 3:
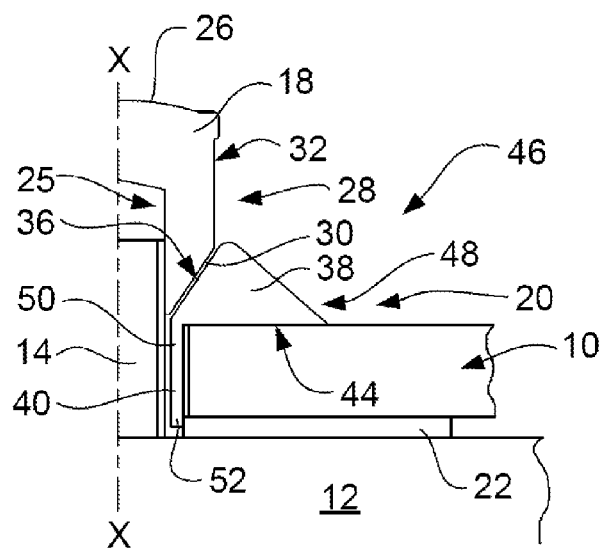
FIG. 3 provides a front elevation cross-section of the attachment arrangement shown in FIG. 2.

As best shown in FIGS. 2 and 3, each fastening nut 18 is a cylindrical cap including a top 26 and a base 28 which annularly extends around the internal bore 25. The internal bore 25 includes a central fastening axis X (FIG. 3). Each fastening nut 18 has an angled engagement portion 30 which 10 extends from the edge of the internal bore 25 (FIG. 3) to the outer radial side 32 of the fastening nut 18. The engagement portion 30 has a substantially complementary angle β (FIG. 4) relative to the fastening axis X to an engagement surface 36 of the head 38 of the fastening washer 20. It should be appreciated that in other embodiments the engagement portion 30 and engagement surface 36 can be flat, being angled 90 degrees relative to the fastening axis X, or have a substantially complementary concave or convex curve.

As best illustrated in FIGS. 2 and 3, the fastening washer 20 comprises a toroid shaped head 38 and axially extending cylindrical sleeve 40. The head 38 and sleeve 40 can be integrally formed from a single piece of material, such as metal, which could be cast, forged or machined from billet. A fastening aperture 42 extends through the axial length of the fastening washer 20. The fastening aperture 42 also includes a central fastening axis X. The fastening axis X of the fastening aperture 42 and internal bore 25 of the fastening nut 18 are aligned when the washer 20 and nut are in use, as shown in FIG. 3. In use, the fastening aperture 42 receives a wheel stud 14 of the wheel mount 12 (FIG. 1).

The head 38 of the fastening washer 20 includes a substantially flat base 44 configured to face and abut the surface of the composite wheel 10 about the attachment aperture 24. In addition, the fastening washer 20 has a fastening side 46 facing substantially axially outwardly from the attachment aperture 24 and base 44. The fastening side 46 includes the annular engagement surface 36 of the head 38. As noted above, the engagement surface 36 has a complementary angle (β) relative to the fastening axis X to the base engagement portion 30 of the fastening nut 18. In use, the engagement portion 30 of the fastening nut 18 engages with the engagement surface 36 of the fastening washer 20 when the fastening nut 18 is assembled on a wheel stud 14 to fasten the composite wheel 10 between the fastening washer 20 and the wheel mount 12. The fastening side 46 also includes an annular trailing surface 48, which radially extends from a peak position of the engagement surface 36 to a radially distal edge of the head 38 of the fastening washer 20. The head 38 therefore has a substantially triangular toroid shape.

Figure 4:
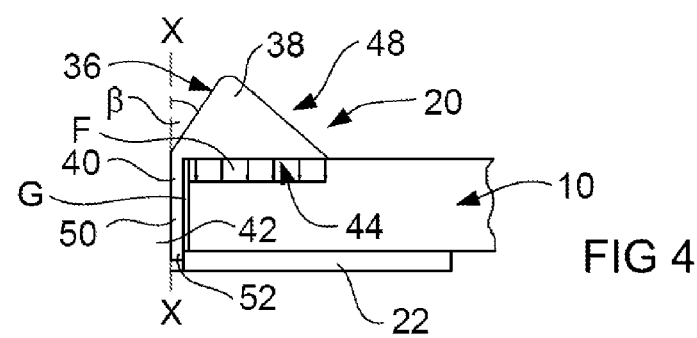
FIG. 4 provides a further front elevation cross-section of the wheel attachment arrangement shown in FIG. 2 illustrating the transfer of forces within the arrangement.

The head 38 of the fastening washer 20 is configured to provide an increased clamping contact area with the surface of the composite wheel 10 surrounding the attachment aperture 24 and thereby increase the area through which the clamping force is applied to that area. As shown in FIG. 4, the angle β of the engagement surface 36 of the fastening washer 20 and corresponding angle of the engagement portion 30 of the fastening nut 18 ensures the force F is distributed away from the edge of the attachment aperture 24 and is more evenly distributed on and through the composite structure. The angle β can be between 10 and 80 degrees, and more preferably between 30 and 60 degrees. In the illustrated embodiment, the angle β is 45 degrees.

The sleeve 40 of the fastening washer 20 is designed to prevent that fastening washer 20 from collapsing inwards when high loads are applied to the attachment arrangement 16. The sleeve 40 extends axially outwardly from the base 44 of the head 38 of the fastening washer 20 about the fastening aperture 42. The sleeve 40 is configured to extend into an attachment aperture 24 of the composite wheel 10. The radial cross-section of body 50 of the sleeve 40 is circular. Furthermore, the radial width of the body 50 of the sleeve 40 is smaller than the radial width of the attachment aperture 24. This forms a radial gap G (FIG. 4) between the outside of the body 50 of the sleeve 40 and the internal sides of attachment aperture 24 in the composite wheel 10. This reduces the possibility of the sleeve 50 transferring some of the clamping load to the walls of the attachment aperture 24.

Figure 5:
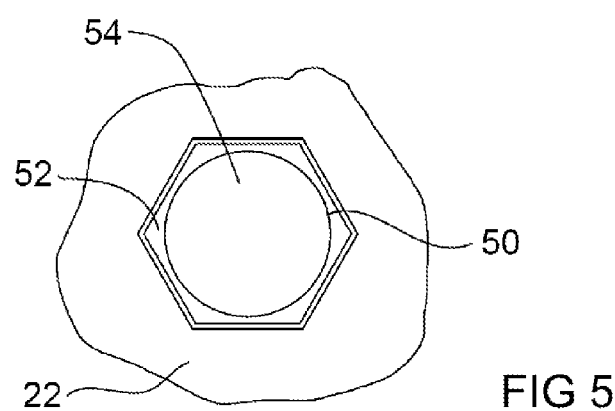
FIG. 5 provides a base view of a fastening washer of the wheel attachment arrangement shown in FIG. 2.

As best shown in FIGS. 2 and 5, the distal end 52 of each sleeve 40 is configured to be received in a complementary shaped sleeve aperture 54 formed in the backing plate 22. As best shown in FIG. 5, the sleeve aperture 54 and distal end 52 of the sleeve 40 can have a complementary hexagonal shape. This complementary shape substantially prevents axial rotation of the sleeve 40 relative to the wheel mount 12. The sleeve aperture 54 is sized to allow at least a portion of the distal end 52 of the sleeve 40 to move through the sleeve aperture 54. The distal end 52 of the sleeve 40 also includes a step change in thickness to provide clearance between the distal end 52 of the sleeve 50 and a section of the surface the backing plate 22 proximal the sleeve aperture 54. This produces a light press fit between the sleeve 50 and the mounting plate 22 allowing the distal end 52 of the sleeve 40 to slide through the sleeve aperture 54 when the attachment arrangement 16 is compressed. This reduces the possibility of the sleeve 40 making contact with the mount 12 and transferring some of the clamping load to the mount 12 or radially within the attachment aperture 24 or sleeve aperture 54.

As best shown in FIG. 2, the backing plate 22 is designed to be inserted between the wheel mount 12 and the composite wheel 10. The illustrated backing plate 22 is a flat toroid plate which includes five annularly spaced apart sleeve apertures 54. As described above, the sleeve apertures 54 have a hexagonal shape designed to receive and interlock with a complementary shaped distal end 52 of the sleeve 40 section of the fastening washer 20. The backing plate 22 functions to substantially prevent axial rotation of each fastening washer 20 within the respective attachment apertures 24 of the composite wheel 10.

It should be noted that the base 44 of the head 38 of the fastening washer 20 may be bonded to the abutting surface of the composite wheel 10 to fix the head 38 of the fastening washer 20 in place on the composite wheel 10. In contrast, it is preferred that the sleeve 40 of the fastening washer 20 is not bonded to the composite wheel 10 in any way. This allows the sleeve 40 to slide relative to the attachment aperture 24 in the composite wheel 10.

Figure 6:
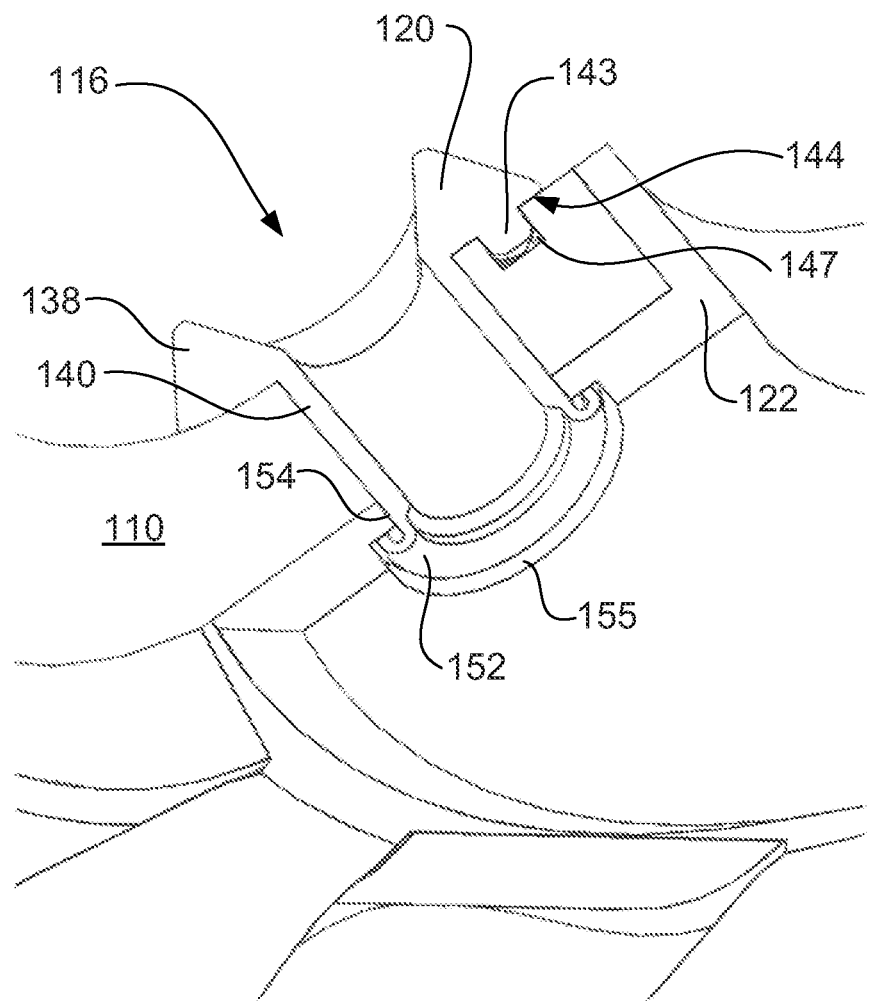
FIG. 6 provides a front elevation cross-section of a portion of an attachment arrangement according to a second embodiment of the present invention.

FIG. 6 shows an attachment arrangement 116 according to a second embodiment of the present invention. The illustrated attachment arrangement 116 is similar to the attachment arrangement 16 illustrated in FIGS. 1 to 5. Accordingly, like features in the attachment arrangement 116 shown in FIG. 6 have been given the same reference numeral as the attachment arrangement 16 shown in FIGS. 1 to 5 plus 100.

The attachment arrangement 116 shown in FIG. 6 comprises fastening nuts (not shown) which can be fastened onto the wheel studs (not shown), fastening washer 120 and a backing plate 122. The fastening nut 118 of the fastening washer 120 has the same configuration as each fastening nut 18 shown in FIGS. 2 and 3. Similarly, the fastening washer 120 and cylindrical sleeve 40 have a similar configuration. In this respect, the fastening washer 120 comprises a toroid shaped head 138 and axially extending cylindrical sleeve 140. The head 138 and sleeve 40 are integrally formed.

Again, the backing plate 122 is designed to be inserted between the wheel mount (not illustrated) and the composite wheel 110. In this embodiment, the sleeve apertures 154 have a circular shape designed to receive but not interlock with the distal end 152 of the sleeve 140 section of the fastening washer 120. Rotation of the fastening washer 120 in this embodiment is prevented by a finger 145 projecting axially out from the base 144 of the head 138 of the fastening washer 120, which is received and seated in a complementary recess 147 in the surface of the composite wheel 110.

The distal end 152 of the sleeve 140 in this embodiment is inserted through the sleeve aperture 154 and then the end is deformed to form a rolled edge, so that it has a greater size than the sleeve aperture 154. The rolled edge is seated in a complementary annular groove 155 provided in the base of the backing plate 122. This rolled edge enables an amount of compressive pre-load to be added to the attachment arrangement 116 during assembly. The arrangement still allows the sleeve 140 to slide through the sleeve aperture 154 relative to the backing plate 122 in one direction but prevents the whole attachment arrangement 116 from falling apart when the fastener element is removed.

The sleeve 140 is manufactured as a straight component with a short section towards the distal end 152 that is made thinner than the main body of the sleeve 140. The distal end 152 is forced into a forming die to roll the edge over in much the same way as a press stud or rivet is secured.

It typically not necessary to use any adhesives in this embodiment and also makes the assembly process of the attachment arrangement 116 simple and quick.

While the illustrate embodiment relates to a carbon fibre wheel 10, it should be appreciated that the illustrated attachment arrangement could be adapted for use with any similar type of composite material, structure or component which is designed to be fastened to a mount and in which compression joint damage can occur.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An attachment arrangement for use in attaching at least one composite wheel to a mount using an elongate fastener element and a fastening nut fastenable on the elongate fastener element, the composite wheel including at least one attachment aperture through which the elongate fastener element is inserted, the attachment arrangement including:

a fastening washer that includes:

a fastening aperture through which the elongate fastener element is inserted when in use, the fastening aperture including a fastening axis;

a base configured to face a surface of the composite wheel about the attachment aperture; and a fastening side facing substantially axially outwardly from the attachment aperture relative to the fastening axis, the fastening side including at least one engagement surface configured to operatively engage a complementary portion of the fastening nut when the fastening nut is assembled on the elongate fastener element;

the attachment arrangement further including a sleeve which extends axially relative to the fastening axis outwardly from the base about the fastening aperture, the sleeve being configured to extend into the attachment aperture of the composite wheel, the sleeve including a distal end configured to be received in a sleeve aperture located in the mount or in an element located adjacent the mount.

2. The attachment arrangement according to claim 1, wherein the sleeve aperture and the distal end of the sleeve have a complementary configuration or feature which substantially prevents axial rotation relative to the fastening axis of the sleeve relative to the mount.

3. The attachment arrangement according to claim 2, wherein the complementary configuration or feature includes at least one of a polygonal shape, irregular shape, spline, flat, recess, shoulder, projection, spigot, key, cavity, groove or finger.

4. The attachment arrangement according to claim 1, wherein the base of the fastening washer includes a fixing feature that which substantially prevents axial rotation of the sleeve relative to the mount.

5. The attachment arrangement according to claim 4, wherein the fixing feature comprises at least one projection, spigot, flange or embossment that is seated in at least one complementary groove, hole, aperture, detent, recess or depression in the surface of the composite wheel.

6. The attachment arrangement according to claim 1, wherein the sleeve aperture is sized to allow only a portion of the sleeve to move through the sleeve aperture.

7. The attachment arrangement according to claim 1, wherein a radial width relative to the fastening axis of the sleeve is smaller than the radial width relative to the fastening axis of the fastening aperture.

8. The attachment arrangement according to claim 1, further including a backing element configured to be inserted between the mount and the composite wheel, the backing element including at least one section of the sleeve aperture.

9. The attachment arrangement according to claim 8, wherein the backing element comprises a plate configured to abut the surface of the composite wheel about the attachment aperture.

10. The attachment arrangement according to claim 8, wherein the distal end of the sleeve has a fixing feature which prevents withdrawal of the sleeve through the sleeve aperture of the backing element.

11. The attachment arrangement according to claim 10, wherein the fixing feature comprises a deformation of the distal end of the sleeve, such that the distal end has a greater size than the sleeve aperture.

12. The attachment arrangement according to claim 8, wherein the composite wheel includes at least two fastening apertures, and the backing element includes at least two sleeve apertures configured to cooperate with sleeves from respective fastening washers inserted through each of the at least two fastening apertures.

13. The attachment arrangement according to claim 1, wherein the base of the fastening washer is bonded to the abutting surface of the composite wheel.

14. The attachment arrangement according to claim 1, wherein the engagement surface of the fastening washer is angled or curved relative to the fastening axis.

15. The attachment arrangement according to claim 14, wherein the engagement surface of the fastening washer comprises a substantially annular portion of the fastening side.

16. The attachment arrangement according to claim 1, wherein the base of the fastening washer includes a flat engagement surface configured to abut the surface of the composite wheel about the attachment aperture.

17. The attachment arrangement according to claim 1, wherein the composite wheel comprises a carbon fibre composite wheel.

18. The attachment arrangement according to claim 8, wherein the sleeve includes a cutout section to provide clearance between the distal end of the sleeve and a section of a surface of the backing element proximal the sleeve aperture.

19. The attachment arrangement according to claim 18, wherein the cutout section comprises a step in the distal end of the sleeve.

* * * * *